US011343269B2

(12) United States Patent
Pon et al.

(10) Patent No.: US 11,343,269 B2
(45) Date of Patent: *May 24, 2022

(54) TECHNIQUES FOR DETECTING DOMAIN THREATS

(71) Applicant: Microsoft Technology Licensing, LLC, Redmond, WA (US)

(72) Inventors: Steven Alexander Daniel Pon, El Cerrito, CA (US); Adam Hunt, El Cerrito, CA (US); Jonas Edgeworth, San Francisco, CA (US); Chris Kiernan, San Francisco, CA (US); Elias Manousos, San Francisco, CA (US); David Pon, El Cerrito, CA (US); Jonathan Matkowsky, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/115,042

(22) Filed: Dec. 8, 2020

(65) Prior Publication Data

US 2022/0070194 A1 Mar. 3, 2022

Related U.S. Application Data

(63) Continuation of application No. 16/057,800, filed on Aug. 7, 2018, now Pat. No. 10,862,907.
(Continued)

(51) Int. Cl.
*G06F 16/25* (2019.01)
*H04L 9/40* (2022.01)
*H04L 29/06* (2006.01)

(52) U.S. Cl.
CPC ........ *H04L 63/1425* (2013.01); *G06F 16/258* (2019.01); *H04L 63/1416* (2013.01);
(Continued)

(58) Field of Classification Search
CPC ......... G06F 16/25; G06F 16/258; H04L 9/40; H04L 63/14; H04L 63/1408; H04L 63/1416; H04L 63/1425; H04L 63/1433
See application file for complete search history.

(56) References Cited

U.S. PATENT DOCUMENTS

2008/0092242 A1 4/2008 Rowley
2014/0053268 A1* 2/2014 Feng ................... G06F 21/57
726/23
(Continued)

FOREIGN PATENT DOCUMENTS

WO WO-2017196430 A1 * 11/2017 ......... G06F 17/3033

OTHER PUBLICATIONS

U.S. Appl. No. 16/057,800, Non-Final Office Action dated Apr. 2, 2020.
(Continued)

*Primary Examiner* — Jayesh M Jhaveri
(74) *Attorney, Agent, or Firm* — Wade IP Law PLLC

(57) ABSTRACT

An inventory of Internet-facing assets related to a username within a social media site is generated using network data gathered from network data sources. Using data sources of known threats, such as malware, phishing attempts, scam pages, blacklisted sites, and so on, a network analytic system generates analytical information about components that are owned, managed, and/or controlled by a target entity. A measure of identity threat is generated based on a classification model using the analytical information.

20 Claims, 3 Drawing Sheets

Related U.S. Application Data

(60) Provisional application No. 62/542,236, filed on Aug. 7, 2017.

(52) U.S. Cl.
CPC .......... *H04L 63/14* (2013.01); *H04L 63/1408* (2013.01); *H04L 63/1433* (2013.01)

(56) References Cited

U.S. PATENT DOCUMENTS

| | | |
|---|---|---|
| 2016/0352772 A1 | 12/2016 | O'Connor |
| 2017/0078321 A1 | 3/2017 | Maylor et al. |
| 2017/0142144 A1* | 5/2017 | Weinberger ......... H04L 63/1408 |
| 2018/0027013 A1* | 1/2018 | Wright ................ H04L 63/1483 726/23 |
| 2018/0048673 A1 | 2/2018 | Hunt et al. |
| 2018/0337947 A1* | 11/2018 | Schiffman ........... H04L 63/1483 |
| 2019/0028508 A1 | 1/2019 | Jeng et al. |
| 2020/0067861 A1* | 2/2020 | Leddy ................ G06Q 30/0185 |
| 2020/0137110 A1 | 4/2020 | Tyler et al. |
| 2020/0177606 A1 | 6/2020 | Vallur et al. |

OTHER PUBLICATIONS

U.S. Appl. No. 16/057,800, Notice of Allowance dated Jul. 27, 2020.

\* cited by examiner

TECHNIQUES FOR DETECTING DOMAIN THREATS

PRIORITY CLAIM

This application is a Continuation of U.S. patent application Ser. No. 16/057,800 filed Aug. 7, 2018, which claims benefit under 35 U.S.C. § 119(e) of U.S. Provisional Application No. 62/542,236, filed Aug. 7, 2017, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to digital cybersecurity risk management, and, more specifically, to techniques for detecting domain threats.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The present invention relates generally to digital cybersecurity risk management beyond the firewall in the nature of digital threat information management to identify, protect, and detect cybersecurity events, as well as reputation events that impair or attack online safety and privacy, including in particular, in relation to DNS (Domain Name System) infrastructure, such as Internet domain-threats whether by properly inventorying all domains in an enterprise's digital footprint, detecting compromises to that infrastructure, or external threats beyond the firewall.

As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible as it is difficult to quickly and efficiently compare the large amount of information contained within the large number of websites that may be associated with an entity. These challenges extend to the enterprise environment, in which an enterprise is faced with the burden of monitoring thousands of web documents accessed throughout an enterprise network including enterprise websites. In an enterprise system having thousands of electronic documents (e.g., documents provided via a website), compliance and security of the enterprise network and the enterprise website becomes difficult to manage.

As the Internet grows in popularity, reliability, and speed, businesses may expose more and more computer assets to the Internet. For example, a business may expose a mail server to the Internet to provide e-mail services for employees, a content server to serve content (e.g., media files) to customers, a web server to serve web pages to customers, an ad server to serve ads to customers, etc. As more and more assets are exposed to the Internet, a business may find tracking which assets are exposed to the Internet difficult. As the number of assets exposed to the Internet continues to grow, it may become difficult to identify Internet assets of a particular business.

The relative ease of attacking, defacing, and impersonating Internet-related assets has placed an enormous burden on enterprises to stay on top of their Internet-facing assets. Every day, thousands of websites are compromised opening a backdoor to sensitive customer, employee, and company data—and damaging the trust between brands and their customers and prospects. Whether the motive is personal or political or financial gain, any business with Internet-facing assets can be victimized. It has never been more important to secure an organization's websites and apps than it is today.

Threat actors sometimes exploit identical, or visually or conceptually similar terms to a trademark or brand (and/or the content in which they are carrying out a threat) in DNS infrastructure, including in resource records (RRs), which are entries in the zone file of a domain name. Each resource record includes a piece of information about a given domain name, such as an SOA, an A record mapping a Fully Qualified Domain Name (FQDN) or hostname to an IP address, or a Canonical Name Record (an alias that maps an FQDN to another FQDN). For example, threat actors sometimes exploit DNS infrastructure by incorporating words that are either identical, or visually or conceptually similar to trademarks or trade names (associated with a particular source of origin) into domain names themselves combined with descriptive or generic terms related to the trademark owner's business or to the threat or context in which the user encounters the domain in order to confuse or deceive users into mistakenly believing that that such information associated with the domain name is from a particular source of origin, i.e., from the trademark owner, or to add credibility to the threat environment. These identical, visually or conceptually similar domain names may constitute a host or part of an RR, an absolute domain, or may be at any one or combination of domain levels in the domain name space. The additional terms may relate either to the trademark owner's goods or services, its field or industry, or to the context in which a user encounters a particular threat that the agent is trying to execute to give it more credibility. While DNS records are discussed above, the techniques described herein also apply to full uniform resource locators (URLs), among other identifiers.

Especially beyond the firewall, it is particularly challenging for enterprises engaged in digital threat information management to manage risk by organizing vast amounts of information, enabling risk management decisions, addressing threats, and improving by learning from previous activities because there is a vast number of domains potentially relevant that must be organized to manage risk and address threats. Threat actors exploit visually or conceptually similar names not only in DNS infrastructure, but in other network-based sources, such as mobile applications and social media sites (and domains such as usernames within social media). The extent to which threat actors have resorted to malicious techniques to resemble a trusted entity or otherwise give credence to the context of their attack has not stopped. Everyone across all industries running cybersecurity risk management programs are being challenged to expend computing resources to continually detect threatening domains as well as other network-based sources, including by confirming their inventory, detecting potential vulnerabilities or compromises, and external threats beyond the firewall.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
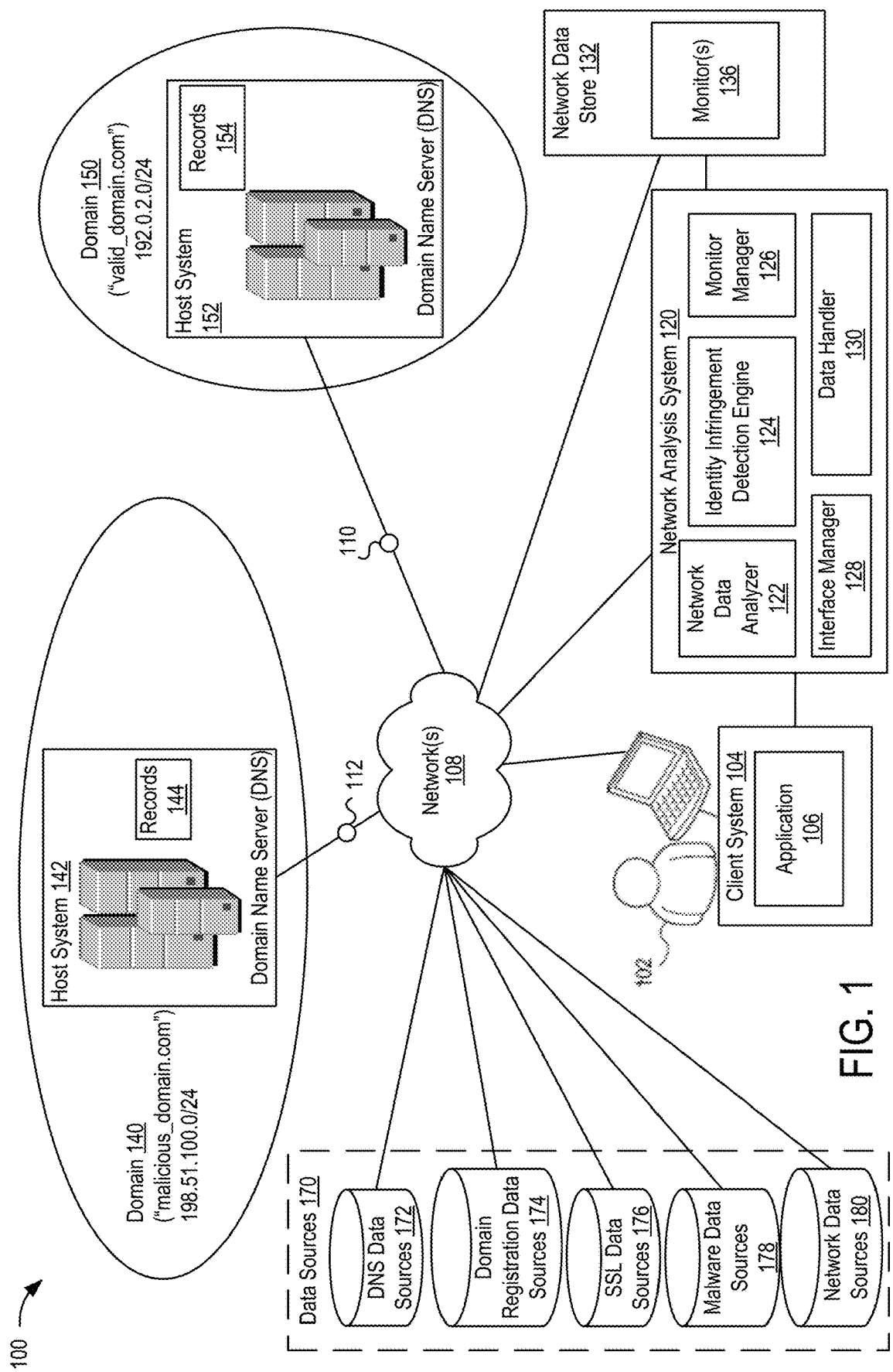
FIG. 1 shows a high-level block diagram illustrating a network analysis system according to an embodiment.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter. In other aspects, the inventive subject matter encompasses computer apparatuses and computer-readable media configured to carry out the foregoing techniques.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Some embodiments, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program, etc.) executed by one or more processing units (e.g., processors cores, etc.), hardware, or combinations thereof. The software may be stored in memory (e.g., on a memory device, on a non-transitory computer-readable storage medium, etc.). In some embodiments, the processes depicted in sequence diagrams and flowcharts herein can be implemented by any of the systems disclosed herein. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in the figures of this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

High-Level View of Network Analysis System for Detecting Infringement of Identities FIG. 1 shows a high-level block diagram of a system 100 according to an embodiment of the present disclosure. One or more of the below-described techniques may be implemented in or involve one or more computer systems. The computing environment in FIG. 1 is not intended to suggest any limitation as to scope of use or functionality of described embodiments.

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including one or more client systems 104 (referred to herein as "client system" or "client") and network analysis system 120. Network analysis system 120 may be implemented by a computing system. Client system 104 may be operated by one or more users (e.g., user 102), such as an analyst, whose role it is to assess network activity including Internet activity. Network analysis system 120 enables a user of a client to perform analysis of infrastructures of network-based digital assets (also referred to herein as "assets," "network assets," or "digital assets"). Such assets may be owned or associated with an entity (e.g., a company or network domain). Examples of network-based digital assets include, without restriction, domain names, hosts, domain name system (DNS) records, Internet protocol (IP) addresses, IP address blocks, mail servers, secure sockets layer (SSL) certificates, web servers, web pages, cookies, and particular files (e.g., advertisements, videos, etc.). The analysis may be used to determine Internet activity based on network data. The processing performed by network analysis system 120 may result in the discovery of information, or "artifacts," about network assets. An artifact may include information identifying the network asset. Although the techniques disclosed herein for monitoring may be described with reference to an artifact or an asset, the techniques are applicable for either of artifacts or assets. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

Network data may include data about hosts, data about domain names, data about DNS records (e.g., passive DNS data, active DNS data, etc.), secure socket layer (SSL) data, malware data, domain registration data (e.g., WHOIS records, etc.), data about Border Gateway Protocol (BGP), other data than can be generated based on data in this disclosure, or a combination thereof. The data about DNS records may be obtained from an implementation of a DNS system. Data about DNS records may include DNS data (e.g., passive DNS data, active DNS data, etc.). DNS data may be obtained from one or more servers implemented for a DNS. Network data may include data related to or involving protocols (e.g., communication protocols, etc.) such as an Internet protocol. Such data may include DNS data or data for a DNS. Examples of protocols may include, without limitation, Hypertext Transfer Protocol (HTTP), HTTP secure (HTTPS), file transfer protocol (FTP), file transfer protocol secure (FTPS), secure copy protocol (SCP), secure shell (SSH) file transfer protocol (SFTP), trivial FTP (TFTP), lightweight directory access protocol (LDAP), directory access protocol (DAP), dictionary network protocol (DICT), TELNET protocol, FILE protocol, Internet message access protocol (IMAP), post office protocol 3 (POP3), simple mail transfer protocol (SMTP). and rapid spanning tree protocol (RTSP). Network data may include data related to communications involving one or more network protocols. The communication may be related to accessing data over a communication network.

Client system 104 may include an interface, such as a physical interface, a graphical interface (e.g., a graphical user interface, etc.), or a combination thereof. A graphical interface may be generated by client system 104, received from network analysis system 120, or a combination thereof. The graphical interface may be updated, modified, enhanced, and regenerated, without restriction, by client system 104 and/or network analysis system 120 in response to one or more events (e.g., an interaction with the graphical interface, etc.). Examples of graphical interfaces are disclosed herein with reference to the figures. The graphical interface(s) enable functionality of network analysis system 120. A graphical interface may be provided by network analysis system 120 via network 108 as part of a service (e.g., a cloud service, etc.) or application. In some embodiments, client system 104 may provide access to one or more applications 106 ("app"). App 106 may enable a user to access and perform services provided by network analysis system 120.

Client system 104 and network analysis system 120 may be communicatively connected via one or more communication networks 108. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Network analysis system 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analysis system 120 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analysis system 120 may be included in or implemented in a RiskIQ™ product or service. In various embodiments, network analysis system 120 may be configured to run one or more services or software applications described in the foregoing disclosure. For example, network analysis system 120 may correspond to a computing system for performing processing as described herein according to an embodiment of the present disclosure.

In some embodiments, network analysis system 120 may be implemented as an enterprise computing system or a cloud computing system comprising one or more computers and/or servers that may include those described above. Network analysis system 120 may include several subsystems and/or modules, including some, which may not be shown. For example, network analysis system 120 may include network data analyzer 122, identity infringement detection engine 124, monitor manager 126, interface manager 128, and data handler 130. Network analysis system 120 may have more or fewer subsystems and/or modules than shown in the figure, may combine two or more subsystems and/or modules, or may have a different configuration or arrangement of subsystems and/or modules. Subsystems and modules of network analysis system 120 may be implemented in software (e.g., program code, instructions executable by a processor, etc.), firmware, hardware, or combinations thereof. In some embodiments, the software may be stored in a memory (e.g., a non-transitory computer-readable medium, etc.), on a memory device, or some other physical memory and may be executed by one or more processing units (e.g., one or more processors, one or more processor cores, one or more GPUs, etc.).

In certain embodiments, network analysis system 120 may also provide other services or software applications can include non-virtual and virtual environments. In some embodiments, these services may be offered as web-based or cloud services or under Software as a Service (SaaS) model to the users of client system 104. The services offered by network analysis system 120 may include application services. Application services may be provided by network analysis system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analysis system 120, which may be implemented as a cloud infrastructure system. Users can acquire the application services without the need for customers to purchase separate licenses and support. Various different SaaS services may be provided. Users operating client system 104 may in turn utilize one or more applications to interact with network analysis system 120 to utilize the services provided by subsystems and/or modules of network analysis system 120.

Network analysis system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in network analysis system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

System 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, other type of database, etc.), one or more file stores, one or more file systems, or combinations thereof. For example, system 100 may be coupled to or may include one or more data sources, such as DNS data sources 172, domain registration data sources 174 (e.g., WHOIS registration sources, etc.), SSL data sources 176, malware data sources 178, and network data sources 180 (e.g., communication records, etc.). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analysis system 120 using network 108.

System 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, other type of database, etc.), one or more file stores, one or more file systems, or combinations thereof. For example, system 100 may be coupled to or may include one or more data stores, such as network data store 132. Network data store 132 may store data for data for implementing monitoring 136. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 132 may be accessible by network analysis system 120 using network 108.

System 100 may include one or more network domains (e.g., an Internet domain name, etc.), such as domain 140 and domain 150. Each domain may be implemented by a host system, which implements a domain name system (DNS) server for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 and domain 150 may be mapped (e.g., via DNS, etc.) to one or more IP addresses. Domain 150 may include a host computing system 152. Host computing system 152 may store records 154 to implement a DNS for domain 150. Domain 140 may be communicatively connected to network 108 via an access network. Domain 150 may be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS, etc.), where each IP address is associated with a host (e.g., a host computing system, etc.). As used herein, a host may include general purpose computers, as well as other devices, that have an IP address. A canonical name (CNAME) record, a type of resource record in the DNS that maps one domain name to another domain name, may also be included herein.

The DNS is a hierarchical database, and can store almost any kind of data, for almost any purpose. Domain names are used by users to identify and connect to Internet hosts and other network resources. The domain name space is a tree structure. Each node and leaf on the tree corresponds to a resource set. Each node has a label. "Domain names" and "hostnames" may be used interchangeably. In the Domain Name System (DNS) naming of computers there is a hierarchy of names. A label is an individual component of a domain name. Labels are usually shown separated by dots. The root of system is unnamed. For example, there are a set of what are called "top-level domain names" (TLDs). The generic top-level domain ".com", or the country-code top-level domain, ".de." "IDN tables" represent permitted code points allowed for Internationalized Domain Name (IDN) registrations in particular registries.

A DNS "name" may not be a word or phrase of a various natural language. It may be a range of mnemonics. Certain contexts require conversions between certain types of labels according to the "Punycode" specification. A hierarchy of names may be created under each TLD. A fully qualified domain name (FQDN), sometimes also referred to as an 'absolute' domain name is a domain name that specifies its exact location in the tree hierarchy. It specifies all domain levels, including the top-level domain and the root zone. A database that makes up the domain space may be distributed among various name servers. Depending on its capabilities, a name server could be a standalone program on a dedicated machine or a process or processes on a large timeshared host. Domain servers store information as a series of resource records (RRs), each of which contains a piece of information about a given domain name, which is usually a host. For example, for the purposes of message routing, the system stores RRs known as MX RRs. Each MX matches a domain name with a preference value and the name of a host. The domain system defines a standard for mapping mailboxes into domain names. By way of further illustration, in addition to mail information, servers store certain other types of RR's. These include the canonical name (CNAME) RR, which states that the domain name queried for is actually an alias for another domain name. From the user's point of view, domain names are useful as arguments to a local agent, called a resolver, which retrieves information associated with the domain. Thus, a user might ask for the host address or mail information associated with a particular domain.

System 100 may implement one or more techniques for network data capture. System 100 may include a data capture system 110, 112 to capture network data communicated via network 108. Data capture system may capture network data actively and/or passively. Active network data may include Active DNS data obtained from monitoring by requesting data about a subset of network assets, e.g., Internet domain names and/or resolution of IP addresses. Network data may include passive DNS data collected from DNS records and/or data gathered by sensors on networks. In other words, passive DNS data may be data that is gathered "passively" by monitoring activity on a network. The sensors may be setup to capture DNS data, such as data about DNS requests and responses occurring on those networks. Passive DNS data may be useful to determine changes to an Internet domain or resolution of an IP address over time.

Data capture system 110, 112 may be implemented by or as a part of network analysis system 120. Data capture system 110 may be implemented using hardware (e.g., network device, etc.), software, firmware, or combinations thereof. Data capture system 110, 112 may passively capture network data by monitoring data as it passes by. The network data may include requests and responses in communications for accessing domain 140 and/or domain 150. Data capture system 110, 112 may be part of or communicatively coupled to network analysis system 120. In at least one embodiment, client system 104 may include an agent ("capture agent") that can capture data communicated in system 100. The agent may be an application that resides on client system 104. The agent may be part of data capture system 110, 112. Data captured by data capture system 110, 112 and/or by the agent may be communicated to network analysis system 120 and/or directly stored in network data store 132. In some embodiments, the data captured may be stored in one or more of data sources 170. In some embodiments, data capture system 110, 112 may actively capture data by querying and retrieving data from one or more data sources 170.

Network analysis system 120 may aggregate network data using passive and/or active data aggregation techniques. Without network analysis system 120, a user such as a network analyst would have to query a myriad of different sources per data type. Network analysis system 120 reduces if not eliminates the amount of time to load each individual data source (e.g., a website, etc.), execute a query and then wait for results. Even once results have been loaded, the user would still need to aggregate them all together. For example, a user interested in aggregating data from multiple data sources 170 may have to implement several processes, including querying web interfaces available to get information from several sources, writing code to query all source APIs (assuming the source has one) to get information, use a combination of web or API queries to collect data. The user would have to communicate with host systems 142, 152 to obtain data about network activity. For example, data handler 130 may perform operations to aggregate network data.

In some embodiments, monitor manager 126 of network analysis system 120 may monitor data to detect an occurrence of an event for which an asset is to be monitored. Network activity by one or more assets may be monitored according to one or more rules. The rules may be defined based on one or more attributes specified by a user through a graphical interface disclosed herein. Although monitoring is described with respect to a single asset or artifact, monitoring may be implemented for multiple assets or artifacts. Attributes may include keywords or other information such as a type of event to monitor. Examples of events to monitor include, without limitation, changes in routable/non-routable, changes in IP address, changes in domain resolution, unique resolution, name server change, content record change for domain (registrant), new SSL certificate on IP, osint on domain/IP change, domain/IP on blacklist, discovery of keyword(s), or a change in any artifact about an asset. The rules may be generated based on input requesting to monitor an artifact for an asset. In one example, network data may be monitored to detect an event (e.g., a network event, etc.) related to an identity of an entity. For example, assets may be monitored to detect a resource (e.g., a hostname, etc.) for a network event.

Monitor manager 126 may perform processing on network data for monitoring events related to an asset. The monitoring may include using data provided by network data analyzer 122 and/or data handler 130. Monitoring may be active or passive. Active monitoring may include inspecting network data and/or communicating with one or more external systems or data sources to determine network data to assess rules for monitoring. Passive monitoring may include assessing network data that is collected by through passive techniques.

Monitoring manager 126 may implement processes to present and/or communicate a notification about an event detected by monitoring. Graphical interfaces may be presented with a visual and/or auditory notification about an event detected by monitoring. Monitoring manager 126 may facilitate communication, to a destination (e.g., a device, an address, etc.), of a notification about an event that is detected by monitoring. The presentation and notification about an event may include information about the event and/or the asset which is the subject of the event. Information related to implementation of monitoring 136 may be stored in data store 132.

Even once a user is able to obtain passive and active network data, a user may be faced with an entire new set of challenges as each source may use its own unique data format. Network analysis system 120 may implement a deconfliction process on the network data to adjust (e.g., normalize, etc.) the network data to a common or standardized format from different formats of the network data obtained from different sources. In some embodiments, data handler 130 may perform processing, such as normalizing network data to a format in which data sets may be determined for an attribute according to a time period. Deconfliction may include adjusting the network data obtained from different sources so that data is aligned for a time period. The network data may include network data having same or different formats and/or covering different time periods. Data handler 130 may adjust network data to a format for a desired time period. The network data may be adjusted so that network data having different formats can be in a format having particular attributes and/or covering a particular time period. In some embodiments, network data may be processed to remove duplicate information. The network data can be further processed to identify a portion or subset of the network data for multiple time intervals (e.g., seconds, minutes, hours, days, months, years, etc.) of a timescale defining a time period (e.g., a series of weeks, a series of months, a series of years, etc.). The subset of the network data for each of the time intervals may indicate information about network activity, such as IP address resolution for an Internet domain name or Internet domain name resolution for an IP address.

The following is an example of network data produced by deconfliction. Below is an example of a first record:

```
{
    'firstSeen': '2016-01-01',
    'lastSeen': '2016-03-01',
    'resolve': '8.8.8.8',
    'value': 'www.google.com',
    'source': 'riskiq',
    'recordType': 'A',
    'resolveType': 'ip_address'
}
```

Below is an example of a second record:

```
{
    'firstSeen': '2015-08-01',
    'lastSeen': '2016-06-01',
    'resolve': '8.8.8.8',
    'value': 'www.google.com',
    'source': 'another',
    'recordType': 'A',
    'resolveType': 'ip_address'
}
```

Deconfliction would result in the following data set based on the first data set and the second data set. The resulting data set can be a combination of multiple data sets having some or all of the same attributes. The data for some attributes may be combined or not included whether the same attribute is not found in the data sets being processed.

```
{
    'firstSeen': '2015-08-01',
    'lastSeen': '2016-06-01',
    'resolve': '8.8.8.8',
    'value': 'www.google.com',
    'source': ['riskiq', 'another'],
    'recordType': 'A',
    'resolveType': 'ip_address'
}
```

Based on the aggregated data, network analysis system 120 can perform operations to store and retrieve network data corresponding to the different time intervals for a time period. Network analysis system 120 may process the network data to identify network activity that can be presented in a graphical interface described below. Network analysis system 120 may use network data store 132 to store data mapping network activity for time intervals (e.g., second(s), minute(s), day(s), etc.) over a time period (e.g., weeks, months, years, etc.). Network analysis system 120 can generate one or more data structures that store information about network activity (e.g., IP address resolution for an Internet domain name, Internet domain name resolution for an IP address, etc.). The information may be stored such that unique network activity is identified for the time interval for display in an interface. The network activity may be mapped or linked to one or more data records including the information for the network activity. Data handler 130 may be configured to perform operations disclosed herein as being performed for handling data, such as aggregation and generating data.

Network analysis system 120 (e.g., data handler 130) may perform operations for managing data about network activity corresponding to interesting events that are identified. The network data stored by network analysis system 120 may be searchable and associated with one or more attributes (e.g., an IP address, a time period, a domain, a source, etc.) related to the data. Data for analysis may be identified based on one or more attributes. The attribute(s) can be specified by input from a user. The attributes may be used to flag network activity interesting to a user based on criteria specified by the user in the graphical interfaces described below. In some embodiments, network analysis system 120 may identify a pattern of malicious and/or non-malicious network activity based on the stored network data. The pattern may be identified according to the network data stored for different time intervals over a time period. Patterns may be further identified based on one or more attributes specified by the user. The attributes may be used to selectively monitor network activity with respect to those attribute(s). For example, network analysis system 120 can determine unique IP address resolutions for an IP address specified by a user. Network analysis system 120 may implement operations to identify and access the network data to display in any of the graphical interfaces disclosed herein. The operations may be implemented by network analysis system 120 to support features of the present disclosure.

Interface manager 128 may implement interfaces to enable functionality for specifying input and viewing classification or measure of threat to an identity of an entity. Interface manager 128 can implement graphical interfaces as disclosed herein including handling of processing interactions to detect input for operations using the graphical interfaces. Interface manager 128 may provide a programming interface, such as an application programming interface (API). A client may communicate a request defined using the API to manage and monitor assets using techniques disclosed herein. Interface manager 128 may provide graphical interfaces in accordance with some embodiments. A graphical interface may be generated based on network data obtained by a network analysis system (e.g., network analysis system 120). The graphical interface may display information about network data based on one or more criteria provided by a user via the graphical interface. Specifically, the graphical interface may display artifacts obtained from network data for one or more network-based assets. The graphical interface may be modified to display additional information or one or more additional graphical interfaces. In response to interaction with a graphical interface as disclosed herein, a network analysis system can perform processing to produce the information for an updated or new graphical interface and can produce the updated/new graphical interface.

In this disclosure, "an element" may be included in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface for which network data is displayed. For a computer system that displays any of the graphical interfaces disclosed herein, the computer system can receive one or more inputs corresponding to an interaction with a graphical interface. The input(s) can be processed to determine the interaction(s) to the graphical interface.

System 100 illustrates only one of many possible arrangements of components configured to provide the functionality described herein. Other arrangements may include fewer, additional, or different components, and the division of work between the components may vary depending on the arrangement.

Processes for Analysis of Network Activity to Detect Infringement of Identities

Figure 2:
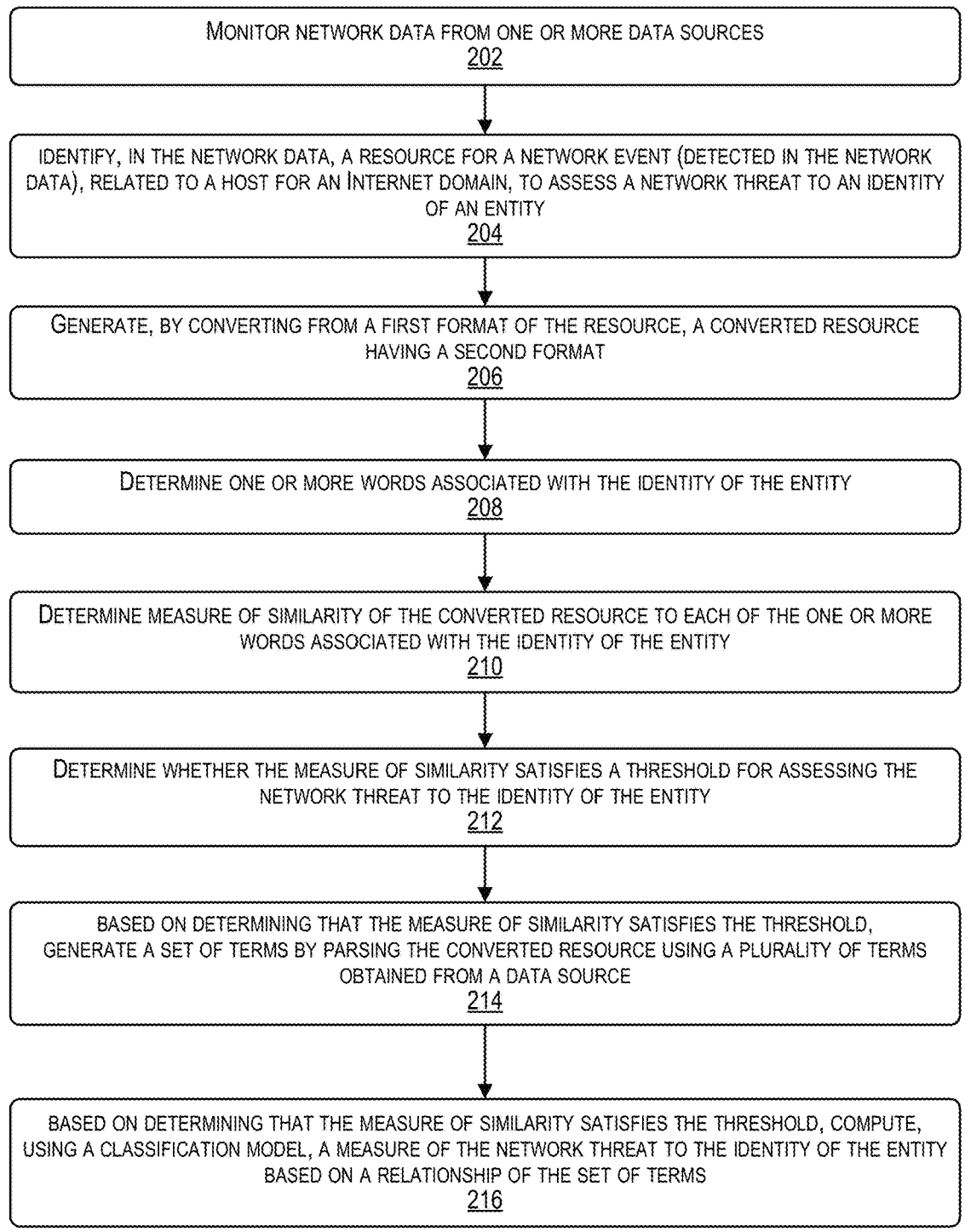
FIG. 2 illustrates a flowchart of a process of identifying a threat to an identity (e.g., a brand or a domain) of an entity according to some embodiments.

FIG. 2 illustrates an example flow (e.g., flowchart, etc.) 200 for identifying a threat to an identity (e.g., a brand, a domain, etc.) of an entity according to an embodiment. The various elements of flow 200 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Processes described with reference to FIG. 2 may be implemented by network analysis system 120 of FIG. 1. Specifically, identity infringement detection engine 124 may implement all or some of the techniques disclosed with reference to FIG. 2. In some embodiments, other modules and/or subsystems of network analysis system 120, can be implemented to perform steps in flowchart 200. Flowchart may include blocks 202-216 including techniques described with reference to FIG. 2.

Flowchart 200 illustrates techniques that may include identifying and ranking identical, or visually or conceptually similar strings in the domain name space for the tendency to be used in certain attacks or to deceive in context, such as in the second level domain, combination of the second and top level domain, or any other combination in a fully qualified domain name (FQDN), or in name servers, MX records, or other resource records that brand owners want to track for purposes of identifying and monitoring risk, or taking action to mitigate an active threat that is taking place with such an identical, or visually or conceptually similar string in the domain name. Some may attempt to detect homograph attacks, such as dual canonicalization. For example, to help prevent confusable words ("confusables") generally, some implementations of Internationalized Domain Names (IDN) provide visual indications where a domain name contains multiple scripts, especially when the scripts contain characters that are easily confused visually, such as an omicron in Greek mixed with Latin text, or when a name contains a mixture of Simplified Chinese with Traditional characters, or to distinguish between zero and uppercase "O". DNS zone administrators may also impose restrictions to minimize characters that have similar appearance or similar interpretations, but the problem of confusable characters or visual spoofing is still exploited to register domains, and some will get through the filters so analysts need to be on the look-out for them. For example, wikipedia.org and wikipedia.org still exist as different websites. Some techniques further include checking misspellings of a brand or trademark or their websites, such as missing characters, double characters, transposed characters, phonetic misspelling, extra hyphens, wrong keys, inserted keys, lookalikes, extra vowels, the dot missing after www or the like, partials, and mirror image characters.

There are combinations of algorithms to detect positive string similarity, such as using the Levenshtein distance algorithm (or a modified version such as a boxcar Algorithm which favors distances on a QWERTY keyboard), N-gram similarity and distance, the Ratcliff-Obershelp algorithm, as well as a FuzzyWuzzy Partial String Similarity. There also algorithms for detecting bit-squatting by calculating the Binary Hamming distance. Especially when a trademark is combined with other terms, the trademark may comprise a string of characters that is a subset of a group of unrelated words or names. As a result, when string similarity algorithms such as the above are used to detect brand infringing strings, though a detected string may include an identical string of characters compared to the trademark, the detected string would not be interpreted as the brand by a user. Removing these false positives can be solved through applying techniques known in the art to calculate reliability scores from word splitting, and parsing domains into keywords from dictionaries.

It is challenging for brand owners to prioritize which domains to analyze and seek to mitigate through enforcement initiatives because there is such a vast number of domains being registered that are potentially relevant, and limited resources for enforcement or investigative action even for the biggest of companies. It is also the case that some terms can function as trademarks owned by different owners so that in one field or sector the characters would call one trademark owner to mind, while when used with other terms, it may call a different owner to mind. Additional descriptive or generic terms appended to the trademark may increase the chances that a domain has a tendency to deceive, or eliminate it all together.

Some may score and prioritize pre-existing and newly registered domains in relation to the context in which the domain name appears, because the context influences the interpretation and significance of the domain to users encountering it. For example, one way that analysts have scored domain names is in relation to the content hosted on the domain name to prioritize the context accordingly. This may be done, for example, by analyzing and sorting by network traffic volume in relation to how often the brand or trademark gets used in connection with certain other keywords or additional terms and/or by crawling the content and looking for certain keywords related to the trademark owner's industry or goods and services to further help prioritize relevant content. Based on the frequency and context, the domains can be scored and accordingly, prioritized. However, threat actors use domain names that have a tendency to cause significant damage through deception attacks even where there is no content on the domain name to be analyzed in relation to the domain name, such as possibly a domain that is about to be used to deliver spear-phishing attacks by email, but has no related content hosted on the domain name because the payload is not hosted on the same domain.

Threat actors that pose a greater risk also use countermeasures to make the content on the domain appear unrelated or harmless, thereby evading detection priority. The industry has dealt with this by also analyzing the network (as opposed to the content) infrastructure related to the domain and its registrant and cross-referencing it with blacklists or threat intelligence and building reputation scores for potential threat actors. Analysts also may sort by the reputation of the TLD itself, or the registrar. However, counter-measures are clearly also being used by threat actors to evade detection in this regard as well. For example, anyone can register a TLD that is so widely used that it cannot be said it has a bad reputation, like ".com" even though by sheer volume, there may be a lot of "badness" occurring in that TLD, or register a domain with a registrar that is so large that it can't be assumed that it is an indication of "badness" that the domain was registered there, and then simply use a different mail server that is so common, that nobody would be able to filter the data based on that mail server alone, and then it may be used the next day to carry out a devastating spear-phishing attack impacting millions of users.

Therefore, certain types of threats can easily evade detection. For example, take the rise of spear-phishing, which may occur with newly registered domains that have not yet actually been used so there is no network traffic yet to analyze in relation to the domain or content on the domain to analyze. Yet, these attacks costs billions of dollars to industry, where the damage is being done by sending emails out but not necessarily hosting any relevant content on the domain for an analyst to be able to score the domain's priority or relevance on that basis. Analysts need to prioritize domain names that have more of a tendency to be successfully used to deceive and may be imminently used for a devastating attack, based on the context in which the trademark or brand appears in the domain name itself as well—as that context too, influences the likelihood of visual confusion, and makes targeted victim or a potential victim more or less susceptible to mistaken transactions based on the likelihood they will mistake that domain as originating from a specific source of origin under the circumstances in which they encounter the domain.

Spear-phishing is but one example. Other examples already mentioned include classic unfair competition or cybersquatting, where it may be necessary to invest resources in monitoring more closely domains that have a tendency to be used to cause a likelihood of confusion with respect to that brand owner in relation to content that has not yet been developed on the site, or that have a tendency to cause conceptual or visual confusion in relation to the type of threat the user would be encountering.

Brand owners may have hundreds or thousands of domains to monitor and prioritize. This presents a challenge to manage the corpus of monitored domains or to prioritize them based on the tendency to cause visual or conceptual confusion in relation to the types of threats these domains could be used for or in relation to the brand owner when there is not yet any content available on the site. While an analyst can use known techniques in the art to study network traffic or how often the trademark term may appear in conjunction with certain terms in the domain, there may not be enough network traffic available, or the network traffic may not be relevant in context to the environment in which the threat is encountered. Relative popularity is based on context, and new trends may not have enough network traffic to use as a benchmark for scoring purposes. As a result, network traffic may be an insufficient indicator in some cases. Network traffic in relation to terms appended to brands would not indicate whether a term in relation to a low ranking brand, generally, is significant in determining a potential threat where the user encounters that domain term when an attack is carried out. Furthermore, network traffic analysis may use manual assistance to identify which words in the domain name impact threat classifications being monitored for a particular brand or mark in a specific industry. Often, terms found in domain names include names of proper places or other nouns not found in a dictionary. For example, Little Bay is a suburb of Sydney, and it is also the name of many other places. An analyst who is trying to prioritize visually confusing domains for eBay that may pose a threat, would likely encounter numerous domains related to LittleBay that have nothing to do with eBay. For example, littlebayphotography.com may be flagged on the basis it contains the visually identical term 'eBay' in the domain as the brand eBay.

The same is true for all threat categories in which a brand or trademark is selected to be used in the domain. For example, there are certain contexts in which unauthorized but legitimate resellers for example, would be using someone else's trademark, and those contexts have certain terms that tend to be used more frequently than others. Another example would be those seeking to express a sentiment in a gripe site. One of the most classic examples is the usage of 'sucks' in conjunction with a brand name. This may tarnish the brand owner's reputation. The same is true for unfair competition or infringement. These are different threat categories that would be prioritized differently by a brand owner in accordance with their preference. In some embodiments, some of the highest priority threats are universally accepted as worthy of attention as quickly as possible across brand owners, such as phishing where a threat actor seeks to steal customer's personal or sensitive data. It should be understood though that in terms of the solution that focuses on the terms in the domain used in contexts, it can be adjusted and modified based on the type of threat classification.

Focusing on phishing and scams by way of example only, domains frequently contain more or less additionally related terms to the goods and services covered by the trademark—as well as more or less related to the contexts in which scams and phishing occur—both factors of which make it difficult to prioritize or score domains based on their risk based on the vast volume of domains that need to be analyzed quickly for a possible attack. For example, a homograph or identical string may appear in the context of terms related to the trademark owner's industry or field, which would increase the likelihood that the domain can be used to deceive the same class of users or target audience as those that are familiar or would become familiar with the brand owner (and considered by them to be a single source of origin for that domain by virtue of the trademark in the domain). In this context, it is also true that some terms would have more of a tendency to be successfully used for a deception attack to deliver a payload or scam a potential victim than others, based on the context of the phishing or scam and the context under which the targeted victim would encounter the potential threat. As an example, 'Password', 'auto-verification', 'account' and other such frequently used terms have significance to a wide variety of contexts in which threat actors would seek to extract personal information from a target.

Certain words also more frequently used in relation to trademarks in contexts where those terms are not being used by the trademark owner, and have a tendency to be thought of in context as not necessarily coming from a single source of origin, or being used with permission or approval from the trademark owner. These terms have less of a tendency to cause confusion, mistake or deception. For example, eBay-account-verification.com would be more likely to be used in a phishing attack because 'account' and 'verification' are often used in such attacks generally, but if the domain was <EbaySucks.net>, "Sucks" is often a word used across trademark owners to disparage brands, and would have less of tendency to be successful to cause deception if it were used as a domain to deliver a phishing payload by email. If the term or word combined with the trademark term is wholly unrelated to the trademark owners field or industry, has no descriptive or generic correlation with the context in which phishing or scams are executed by way of example, and also has no relationship with other known contexts in which confusion may occur (as users have come to appreciate that not every use of a mark is necessarily with the brand owner's permission or approval), then it would naturally be analyzed only after a domain with one or more of the features described herein were present, because it would be considered as less potentially harmful and have a lower risk score with respect to the nature of the threat the analyst is seeking to mitigate.

These and other related challenges may be solved by techniques described with reference to flowchart 200. Techniques disclosed with reference to flowchart 200 include automating the process of identifying and ranking identical or visually or conceptually similar strings in the domain name space for the tendency to be used in certain attacks or to deceive in context, such as in the second level domain, combination of the second and top level domain, or any other combination in a fully qualified domain name (FQDN), or in name servers, MX records, or other resource records that brand owners want to track for purposes of identifying and monitoring risk, or taking action to mitigate an active threat that is taking place with such an identical, or visually or conceptually similar string in the domain name.

Flowchart 200 begins at block 202 by monitoring network data from one or more data sources. Network data may be monitored using techniques disclosed herein. In at least one example, network data may be monitored using DNS data, registration data (e.g., WHOIS databases, etc.), and crawls for network data. Brand owners analyze threat intelligence that includes newly detected domain names to mitigate against these risks and to score existing domains to be analyzed. Sources of detected domain names that may be subject to analysis include zone files, DNS data, crawling Web data, inbound communications via email (both in the message body and in the headers), messages, chat, etc.

Network data may be monitored for a resource based on one or more criteria with respect to an identity of an entity. The criteria may define a brand, a domain, or a name associated with the entity. In some embodiments, a graphical interface may be provided that can receive the criteria for monitoring an identity of an entity. Network data may be monitored to exclude resources, including host systems, domain names, and other network assets which may be owned by an entity. Non-malicious resources and/or resources owned by an entity may be excluded from monitoring such that the entity does not wish to subject those resources for analysis of a threat. A user may specify one or more criteria, including identification of resources, for excluding resources from monitoring network data, such that the network data related to those resources is not considered for analysis in the process of flowchart 200.

Network data may be accessed from one or more data sources. The network data may be accessed for a time period. The network data may include Domain Name System (DNS) data for one or more Internet domain names or IP addresses. The DNS data may include active DNS data, passive DNS data, or both. Data handler 130 of FIG. 1 may perform operations disclosed with reference to block 202. In at least one embodiment, network data may be accessed from a combination of "feeds" of domain names to be analyzed, such as without limitation, zone files, passive DNS data (pDNS), crawled Web data, extracted domains from abuse boxes, etc. The feed can also be adjusted to prioritize only newly registered domains as well as domains that have exhibited change in Whois or DNS, particularly passive DNS data.

In some embodiments, monitoring the network data may include adjusting the network data for a time period based on first network data and second network data included in the network data. The first network data may have a first format. The second network data may have a second format that is different from the first format. The network data may be adjusted by implementing a deconfliction process. The adjusting may include generating network data that is normalized, or has a format common to one or more attributes of the data.

Monitoring the network data may include generating a plurality of data sets. The plurality of data sets (e.g., a plurality of data records, etc.) may be generated based on one or more attributes specified by a user. Each of the plurality of data sets may corresponds to a different one of a plurality of time intervals within a time period. The data sets may be generated based on identifying the network data corresponding to an attribute. For example, an attribute is an Internet domain name or an IP address. Where the attribute is an Internet domain name, each data set in the plurality of data sets may indicate one or more IP addresses that have been resolved for the Internet domain name. Network data analyzer 122 and data handler 130 of FIG. 1 may perform operations disclosed with reference to block 204.

Monitoring the network data may include analyzing the network data to discover one or more network events related to the criteria for which to monitor an identity of an entity. The criteria may include an identity of an entity, such as an Internet domain. Network events may be discovered based on analyzing the network data for each distinct network asset during a time period. The network data may be assessed to determine whether it contains any threshold amount of information that matches the criteria. For example, the network data may be processed to identify an asset that has a name which matches the attribute. The network data may be assessed to identify potentially malicious assets using one or more data sources. A network event, such as a request to access domain, may be identified based on detecting in the network data the criteria (e.g., a host for an Internet domain, etc.). In some embodiments, the network data may be monitored with respect to a threshold, such as a threshold measure of occurrences of a particular network event. As such, flowchart 200 may include detecting, in the network data, a specific occurrence (e.g., a first occurrence, etc.) of the network event. A first occurrence may be a significant event as that is the first instance that the criteria (e.g., a domain name, etc.) is satisfied by discovery. For example, a first instance may of a significant event may be indicative of a new host name that is a threat to a domain for an entity. In another example, a network event may be detected with respect to an occurrence of a change in a resource. For example, a resource may be a hostname of a host system identified in the network data for the network event. In another example, a resource may be an application identified in the network data for the network event. In yet another example, a resource may be a social media web page identified in the network data for the network event. In another example, a resource may be a uniform resource locator (URL) identified in the network data for the network event. For example, a change in WHOIS information for a hostname or DNS records for a hostname may be identified as an occurrence.

At block 204, based on detecting, in the network data, a network event related to a resource (e.g., a host for an Internet domain, etc.), identifying, in the network data, a resource for the network event to assess a network threat to an identity of an entity. A resource may have a format (e.g., a first format, etc.). The resource may be identified as a name or text defining the resource. For example, a resource a host system identified in the network data for the network event and a resource name (e.g., a hostname, etc.) may be identified for the host system. In another example, a resource may be an application and a resource name may be identified as a name of the application identified in the network data for the network event. In yet another example, a resource may be a social media web page or profile identified in the network data for the network event. In another example, a resource may be a uniform resource locator (URL) identified in the network data for the network event. A resource may be defined by a name or content having a format. A resource may be a network asset.

A resource, e.g., a hostname, may be identified for a network event in a variety of ways. Flowchart 200 may include determining that the identified resource is identified as a network event based on one of different types of network events. For example, a network event may be identified for a resource on the basis of the resource having a host name that was registered within a time period. In another example, a network event may be identified for a resource based on being associated with a domain registration for an Internet domain associated with an identity of an entity. In another example, a network event may be identified for a resource based on being associated with a change in Domain Name System (DNS) data for the Internet domain associated with an identity of an entity.

An interface (e.g., a graphical interface, etc.) may be generated that displays the information about assets based on the plurality of data sets. Information for each unique network asset may be displayed for a time interval. The data sets corresponding to the network asset may be used to display information about each unique network asset including artifacts about the network asset for the network event. Network events that are identified for a resource may be displayed as such indicating the resource corresponding to the network event(s).

At block 206, a converted resource is generated having a format (e.g., a second format, etc.). The resource may be converted from the first format to a second format. In the example of a host name, a host name that is identified for a network event may have a first format, based on which a converted hostname is generated having a second format.

In at least one embodiment, generating the converted resource, where the resource is a hostname, includes decoding the hostname from the first format that is encoded by Punycode. Many threat actors will try to hide domain infringement by creating a domain name that uses non-ASCII characters that will display similarly to ASCII characters—for example, "riskiqbånk.com" instead of "riskiqbank.com." Since URLs may only contain a limited number of characters (a subset of ASCII), these hostnames will be encoded via Punycode. For example, "riskiqbånk.com" will be encoded as "xn--riskiqbnk-ora.com." A web browser would then decode this hostname and display it as "riskiqbånk.com" to a user (although the various browsers have algorithms that determine when they will decode Punycode, in a limited attempt to avoid problems such as domain infringement). In the Domain Name System (DNS) naming of computers there is a hierarchy of names. A label is an individual component of a domain name. Labels are usually shown separated by dots. The root of system is unnamed. For example, there are a set of what are called "top-level domain names" (TLDs). The generic top-level domain ".com", or the country-code top-level domain, ".de." "IDN tables", represent permitted code points allowed for Internationalized Domain Name (IDN) registrations in particular registries. A DNS "name" may not be a word or phrase of a various natural language. It may be a range of mnemonics. Certain contexts require conversions between certain types of labels according to the "Punycode" specification. As such, a hostname may be converted from Punycode by being decoded from Punycode.

In the example of converting a host name, flowchart 200 may include mapping a decoded hostname to a new hostname (e.g., a converted hostname, etc.). The decoded hostname is mapped to the converted hostname based on one or more mappings, wherein each of the one or more mappings is for one or more homoglyphs in the decoded hostname to one or more ASCII equivalents. This ensures that a hostname as identified for a network event is analyzed as what a user would likely interpret it to be. The converted hostname may be based at least in part on the one or more ASCII equivalents for the one or more mappings.

At block 208, one or more words associated with the identity of the entity are determined. The words may include keywords (e.g., names, etc.) that are associated with one or more trademark names associated with a brand of an entity. The trademark names are owned by the entity. The keywords may be obtained from a data source, such as a registry of trademark names for the entity. The words may include acronyms and/or synonyms of determined from a variety of sources. A synonym database is maintained to cross-reference terms in the database against the synonym database and to the extent there is a match with a synonym, it would be considered although weighed as less significant than a primary source.

At block 210, a measure of similarity of the converted resource (e.g., hostname, etc.) to each of the one or more words associated with the identity of the entity is determined. The measure of similarity is determined by comparing the converted resource, if a name, to each of the one or more words associated with the identity of the entity. The measure of similarity may be determined based on computing a similarity distance (e.g., string distance, etc.) for each of the one or more words compared to the converted hostname. A string distance may identify words that are roughly similar. For example, this step may identify a hostname, such as "friskyband.com," being similar to "riskiqbank.com" associated with the brand "RiskIQ Bank."

To the extent a brand owner has had a confirmed incident related to a particular string of characters in the past, variations of that may also be taken into account—the algorithm may look to see if any of the words are close variations to a prior threat. For example, if a threat actor has registered BRANDCareers.com in the past to engage in a spear-phishing attack to conduct fraudulent job interviews, when that domain is shut down it is very possible that the threat actor will register down the road BRANDCareer.com to carry out the same kind of attack.

Threat actors generally exploit identical, or visually or conceptually similar terms to the trademark or brand (and/or the content in which they are carrying out a threat) in the domain name space, or into RRs—the information associated with domain names, such as name servers, the MX or CNAME. This may be to send phishing, malware or scam emails from, to add credibility to a payload in a phishing email or being used to distribute malware, or to host infringing or abusive content that tarnishes the brand, interferes with visitors' privacy, or for unfair competition purposes by causing mistakes or confusion in purchasing transactions. Threat actors may register and use identical or visually or conceptually similar strings in order to deceive or confuse Internet by hosting phishing content on the domain or distributing malware on it.

Some threat actors are more traditional cyber squatters that register and use identical, visually, or conceptually similar terms to the trademark or brand to disrupt a brand owner's business or because they want to cause confusion or mistakes, such as for competitive purposes, or to passively hold it for purposes of selling it to the brand owner or their competitor for a profit. Threat actors may also tarnish the brand by virtue of the string of characters expressing a sentiment, or by virtue of the content being hosted on the domain. Other times it is not in fact a threat actor as that term is commonly understood, but simply someone engaged in activity that is undesirable to the trademark owner, such as potentially a gripe site, or a reseller that is unauthorized but legitimately using the trademark nominatively to refer to the brand owner's goods or services in a way that is not necessarily objectionable from a legal standpoint.

Threat actors exploit domain names terms by incorporating words that are either identical, or visually or conceptually similar to trademarks (which are associated with a particular source of origin) into domain names combined with descriptive or generic terms related to the trademark owner's business or to the threat or context in which the user encounters the domain in order to confuse or deceive users into mistakenly believing that that such information associated with the domain name is from a particular source of origin, i.e., from the trademark owner, or to add credibility to the threat environment.

These identical or visually or conceptually similar domains may constitute a host or part of an RR, an absolute domain, or may be at any one or combination of domain levels. The additional terms may relate either to the trademark owner's goods or services, it's field or industry, or to the context in which a user encounters a particular threat that the agent is trying to carry out in order to give it more credibility.

At block 212, the measure of similarity is assessed to determine whether it satisfies a threshold for assessing the network threat to the identity of the entity. The threshold may be a value that defines a measure of similarity for matching words associated with an identity of an entity. The value may be the number of matching words that defines a threshold for the measure of similarity, the number of letters matching between words, or some other measure of string similarity.

At blocks 214-216, based on determining that the measure of similarity satisfies the threshold, flowchart 200 may include determining a measure of network threat to an identity of an entity. One or more sources providing a plurality of terms may be used to parse the converted resource (e.g., hostname, etc.) into a set of terms. A measure of a network threat to an identity of an entity may be determined based on a relationship of the set of terms.

In one example, if we find that a hostname is a close match for a keyword, then we perform the final step of classification. While a string distance may give us words that are roughly similar, it will not interpret a hostname as a human user would. For example, "friskyband.com" is similar to "riskiqbank.com", but a human user would not think that "friskyband.com" was somehow associated with the brand "RiskIQ Bank." In order to mimic most closely how a user would interpret a hostname, we use a dynamic programming approach to parse a hostname into its most likely terms, or tokens. For example, the parser would deduce that "riskiqbank.com" should be tokenized as "riskiq/bank/com." Since many domain infringement attempts will take advantage of common misspellings and common "fat finger" typos, such as "riskiqbanck.com" or "riskqbank.com" or "riskiqvank.com," the parser will also look for slightly misspelled words when it parses a hostname. It then uses several features of the parsed hostname, such as "Does it include the keywords we are looking for?" "Are they misspelled?" "How many other 'real' words are in the hostname, and how much of it is random characters?" The analysis by the parser may use a classification model. The classification model may be defined as a hierarchical decision tree (e.g., a decision tree model, etc.) to decide if a hostname is infringing or not.

In at least one embodiment, at block 214, based on determining that the measure of similarity satisfies the threshold, a set of terms may be generated by parsing the converted hostname using a plurality of terms obtained from a data source. One or more data sources may be used for obtaining the plurality of terms. The data sources are different from those used to access network data. A first data source may include anchor text scraped from web pages, containing about a number of common strings (e.g., 30000 common strings, etc.) found on the web, concatenated with any keywords we might be searching for. Another source may include a dictionary from which a list of English words (e.g., the big.txt file commonly included with Unix, etc.). At its most basic level, parsing will include reading through a hostname and dividing the converted hostname into the most likely tokens using the terms from the data source. Terms may be assigned an equal probability for the parsing, probabilities relative to their occurrence in written language, or other probability weighting.

Parsing the hostname may include parsing the hostname into tokens by characters such as punctuation. In order to increase efficiency, each parser has a cache of previously parsed strings and will pull a parsing from this cache if a string has been seen before rather than reparsing. In one example, a hostname "my.fake-authenticbank.com" will be tokenized as "my/fake/authenticbank/com," and each of these tokens will then be passed to the parser(s).

In at least one embodiment, parsing the converted hostname may be tuned through the setting of several parameters. If a certain substring of a hostname is not a word in the base dictionary, but happens to be a close misspelling of a dictionary word (by insertion, deletion, replacement or transposition), the parser may note this. The substring of a hostname may be parsed as the word in the dictionary, with a probabilistic "penalty" for having a misspelled word. The degree of this penalty is one parameter that may be set. Another parameter may be defined as a minimum length of word misspellings, such that parsing may accept misspellings of words above a certain length to avoid obvious misspellings that would not confuse a user. This minimum word length is another parameter that may be set. Parsing may favor keywords that are being searched for over other terms—that is, it may prioritize a trademarked name over other words in the base dictionary. One or more additional data sources may be used for selectively parsing terms from a hostname. The degree of this prioritization of keywords from different data sources is another parameter. The length of keywords being searched for may be important for parser behavior. For example, short brand names are likely to occur in randomly generated strings; e.g., the brand "abc" in "asfdih4983n849lasdhabcas843sdj.bank.com"; if we allow misspellings of short brand names, they would be even more likely to occur ("abc" would be found if the hostname parsed "arc" or "abs," etc.). A minimum length threshold is another parameter that may be set for searching for misspellings of brand names. Another parameter may be assigning a penalty to parsing singletons. One-character strings may not be included in a data source (e.g., a base dictionary, etc.), but may be treated similar to misspelled words. Yet another parameter may be a choice of one or more data sources from a plurality of data sources. Another parameter is a maximum number of numerical digits to parse. Some hostnames are generated automatically and may be long with many numerical digits. To increase efficiency, hostnames with many numerical digits will not be parsed based on satisfying the maximum numerical digits in the hostname. A maximum number of numerical digits that may occur in order for a hostname to be parsed.

At block 216, based on determining that the measure of similarity satisfies the threshold, a measure of network threat (e.g., a first measure, etc.) is determined for the identity of the entity for which a resource is identified for a network event. The measure of network threat is determine based on a relationship of the set of terms determined at block 214. For example, after identifying that a word associated with an identity of an entity may exist in the converted resource, the parsed terms (e.g., set of terms, etc.) may be compared with each other using the data source to determine whether the terms have any meaning together as a relationship. Continuing with the example above, "riskiqbank.com" should be tokenized as a set of terms ("riskiq/bank/com"). These terms and their misspellings would be compared with respect to a classification model (e.g., a hierarchical model, etc.) considering whether the terms infringe upon a brand of the entity.

A measure of network threat may be computed as a value on a scale based on assessing the set of terms as a relationship. For example, the terms may be compared using different weights with respect to each of the terms. For example, the terms "riskiq" and "bank" would be compared to each other to determine whether they, or their misspellings, are identified as having a relationship. One or more additional sources may be used to determine whether the set of terms have a relationship or meaning. Examples of sources include those sources described below, such as a repository of classifications of trademarks with respect to categories of services and goods.

In some embodiments, multiple measures of network threat may be determined, each using a different data source. After block 216, flowchart 200 may include computing a second measure of a network threat to the identity of the entity based on assessing the plurality of terms using a second data source. Based on multiple measures, a third measure of network threat may be determined for an identity of an entity. The third measure may be determined based on a combination of the multiple measures. The multiple measures may be aggregated and then averaged or each weighted individually to determine a combined weighted value as the third measure. A second data source may include one of many different third party resources to further filter the set of terms and identify a possible relationship between the set of terms for a classification of a threat. Examples of sources include, without limitation, a repository of malicious names, a repository of classifications for a brand (e.g., a United States Patent and Trademark Office registry of classifications of trademarks for an entity, etc.), and a repository of published decisions under Uniform Domain-Name Dispute-Resolution Policy (UDRP).

A database of threat classifications comprising a plurality of actual or potential threat scenarios can be created, where each actual or potential threat scenario within a threat classification shares a plurality of common attributes, and according to the context from the meaning of the domain name detected, identifying whether the registered domain shares common attributes with words associated with the actual or potential threat scenarios using a clustering analysis algorithm. The threat classifications can include negative attributes as well as positive ones. For example, fair use terms could be filtered out. The information sources associated with reporting or discussion certain types of threats may be checked. For example, websites that discuss domains that have been used in 419 scams will be used to cross-reference the words against the domain to score them as related to the targeted threat classification. This is done by applying the tokenization to the extracted domains from the threat database. The threat database may be several sources such as recent UDRP decisions involving that threat. Terms are given more significance to the extent they appear more frequently across the relevant information sources, or to the extent they are more recently discussed to indicate new trends. A synonym database is maintained to cross-reference terms in the database against the synonym database and to the extent there is a match with a synonym, it would be considered although weighed as less significant than a primary source. To the extent there has been a confirmed threat with another brand, based on when that confirmed event occurred in the past, a more recent one may be weighted with a higher score than one that only appeared for example, in the direct relevant information sources for the threat but had no confirmed existing threat for another brand. This is done through tokenization of the domains to identify threat terms used in other contexts.

In some embodiments, a hostname may be cross-referenced against both the brand owner and other brand owners' workspaces in order to determine a classification. For example, a brand owner's own workspace would have a relatively higher score compared to other brand owner's workspaces, but a variation in a hostname may generate an event in another workspace not owned by the brand owner because it is deemed important to score that variation with a higher score rather than not generating the event at all. For example, recent types of spear-phishing attacks related to an information source may generate the event in a workspace associated with the brand owner or associated with other brand owners. For example, a spear-phishing attack may be identified by the FBI and appear in a workspace associated with the FBI, even if the attack includes content associated with a particular bank. In one embodiment, all other brand owners may be asked about previous confirmed threats to see if a term has been used recently in an attack, as well as counts how frequently terms have been used with other brands so that those domains get prioritized.

In at least one embodiment, blocks 214 and 216 may be implemented to identify visual spoofing of a brand with no additional words (e.g., short typos replacing a letter "l" with a number "1", repeating a letter, omitting a letter in the domain, etc.). For example, the letter "l" may be repeated in www.gmaill.com instead of gmail.com. A converted hostname may be parsed using parameters that enable the set of terms to be identified based on visual spoofing.

In one embodiment, blocks 214 and 216 may be implemented to consider words that customers are used to encountering online when they enter credentials online for a legitimate brand. For example, Company Online Banking is located at https://www.company.com/online/digital/online-banking.html. By extracting the titles, descriptions and keywords from the legitimate site, words like "Online" or "Banking" would be given priority if encountered in a domain. These words may be given more weight in parsing and/or the classification model when comparing a relationship of terms determined by the parser. In another example, users log in to Company at https://login.company.com/ftgw/Fas/Company/RtlCust/Login/Init?AuthRedUrl=https://oltx-.fidelity.com/ftgw/fbc/ofsummary/defaultPage. Flowchart 200 may include extracting metadata from the legitimate site such as the following:
meta name="description" content="Log in to your Fidelity Investments or NetBenefits accounts here.">
<meta name="description" content="Log in to your Fidelity Investments or NetBenefits accounts here."/>
<META http-equiv="Expires" content="Mon 13 Jun. 1988 00:00:00 GMT">
<META http-equiv="pragma" content="no-cache">
<meta name="viewport" content="initial-scale=1,user-scalable=no"/>
<meta http-equiv="X-UA-Compatible" content="IE=edge,chrome=1"/>

Words like "Investments," "NetBenefits," would therefore be scored higher for Company for this threat classification. This is a way to prune the keywords for that brand, but give some weight to certain keywords over others depending on whether they are encountered in connection with logging in to a legitimate site. A dictionary of the common terms across the industry could be developed this way. As such, the data source for determining the set of terms may be based on such techniques for identifying words common to a domain, or a particular industry that can be used for parsing a hostname. "NetBenefits" may not show up across the banking sector, for example, except in relation to Company. But "Online Banking" may be popular when extracted across the industry keywords, descriptions and titles of legitimate websites. Therefore, it can be scored for how popular those terms are in relation to the industry as well as in relation to the brand holder specifically.

In at least one embodiment, a secondary source may be used to determine a measure of network threat to an identity. The secondary source may be generated based on phishing UDRP decisions for the terms that impact on the particular industry or show up frequently enough across industries, weighed by how recently those terms show up. For example, a feed similar to http://www.udrpsearch.com/, where you could search the decisions for "phishing" generic top-level domain ("gTLD") decisions. Similar databases exist for country code top-level domains ("ccTLDs") and related proceedings. For example, in May 2017, Google™ reclaimed a domain <gmail-support.org> alleged to have been involved in a phishing scheme, and on Feb. 27, 2017, Dell™ reclaimed a domain <dell-laptop-support-number-.com> alleged to have been involved with phishing too; and on Apr. 28, 2016, Yahoo reclaimed domains with "Support" alleged to be used for phishing schemes. So, a word like "Support" may be weighed over a neutral term for the fact it appears across companies in UDRP decisions for phishing activity. It is also possible to weigh it even more if the brand is in the same or related industry as explained below with respect to tracking a brand owner's marks in relation to class headings.

In at least one embodiment, the data source at block 214 and/or secondary data sources may include a repository of subdomains that an entity has used to encountering in connection with the legitimate brand. The repository may be used to weight terms related to each other based on appearance in the repository. For example, if "store.nike.com" exists on the top-level domain "Nike.com," domains that are contested or disputed, such as "NIKE-STORE.COM.HK," would be flagged as a higher risk as it has the term "store" in it. This is a way that keywords can be generated in relation to the brand.

In at least one embodiment, a brand owner's trademarks or affiliated names are tracked in relation to the Class Headings as designated by an international organization that classifies international trademarks. Terms that are commonly appearing across various brands in the same class would be scored higher. Such techniques may be applied as a source for classifying a relationship of terms parsed from a hostname. For example, the term 'Bank" may appear many times across Class 36 customers. So, it is weighed as more relevant than if it just appeared in one customer's workspace that happens to be a bank. More generally though, using the taxonomy available from Nice, a search for banking services discloses a taxonomy of related goods and services. On the highest level, there are services that fall within financial and monetary services, and banking, as opposed to other Class 36 services that may fall into real estate or insurance. The algorithm should first look for words within the closest taxonomy structure. So for a bank, "online banking" would be closer in the taxonomy than related services such as debt recovery or insurance, but these terms would be weighed for being in Class 36 more closely than other terms.

In some embodiments, domains with low reputations (feeds) can be queried for the most popular generic terms that appear. These terms can be used in a repository, or a classification model, to determine a relationship of terms of a brand with respect to the generic terms to identify a threat to an identity of a domain.

Flow 200 illustrates only one of many possible flows for identifying a threat to an identity (e.g., a brand, a domain, etc.) of an entity. Other flows may include fewer, additional, or different elements, in varying arrangements.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

Computer Systems for a Network Analysis System and Client System(s)

Figure 3:
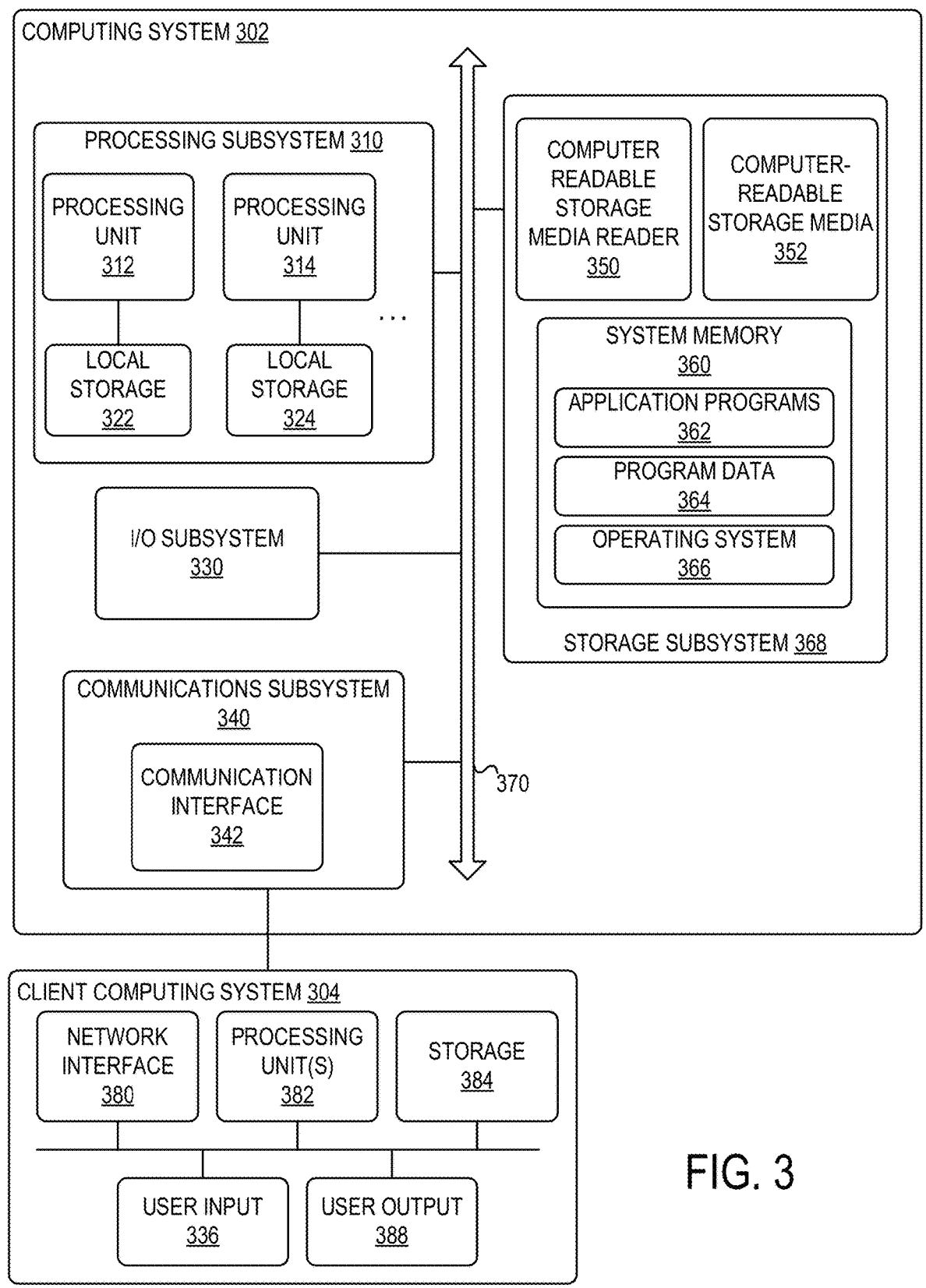
FIG. 3 shows a simplified block diagram of a computing system and a client computing system usable to implement some embodiments.

Various operations described herein may be implemented on computer systems, which may be of generally conventional design. FIG. 3 shows a simplified block diagram of a representative computing system 302 and client computing system 304 usable to implement certain embodiments of the present disclosure. In various embodiments, computing system 302 or similar systems may implement network analysis system 120, or any other computing system described herein or portions thereof. Client computing system 304 or similar systems may implement client system 104, or other client systems described herein.

Computing system 302 may be one of various types, including a handheld portable device (e.g., an iPhone® cellular phone, an iPad® computing tablet, a PDA, etc.), a wearable device (e.g., a Google Glass® head mounted display, etc.), a personal computer, a workstation, a mainframe, a kiosk, a server rack, or any other data processing system.

Computing system 302 may include processing subsystem 310. Processing subsystem 310 may communicate with a number of peripheral systems via bus subsystem 370.

These peripheral systems may include I/O subsystem 330, storage subsystem 368, and communications subsystem 340.

Bus subsystem 370 provides a mechanism for letting the various components and subsystems of server computing system 304 communicate with each other as intended. Although bus subsystem 370 is shown schematically as a single bus, alternative embodiments of the bus subsystem may utilize multiple buses. Bus subsystem 370 may form a local area network that supports communication in processing subsystem 310 and other components of server computing system 320. Bus subsystem 370 may be implemented using various technologies including server racks, hubs, routers, etc. Bus subsystem 370 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 330 may include devices and mechanisms for inputting information to computing system 302 and/or for outputting information from or via computing system 302. In general, use of the term "input device" is intended to include all possible types of devices and mechanisms for inputting information to computing system 302. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection, etc.) from users and transforms the eye gestures as input into an input device (e.g., Google Glass®, etc.). Additionally, user interface input devices may include voice recognition sensing devices that enable users to interact with voice recognition systems (e.g., Ski® navigator, etc.), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 302 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 310 controls the operation of computing system 302 and may comprise one or more processing units 312, 314, etc. A processing unit may include one or more processors, including single core processor or multicore processors, one or more cores of processors, or combinations thereof. In some embodiments, processing subsystem 310 may include one or more special purpose co-processors such as graphics processors, digital signal processors (DSPs), or the like. In some embodiments, some or all of the processing units of processing subsystem 310 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 322, 324. Any type of processors in any combination may be included in processing unit(s) 312, 314.

In some embodiments, processing subsystem 310 may be implemented in a modular design that incorporates any number of modules (e.g., blades in a blade server implementation, etc.). Each module may include processing unit(s) and local storage. For example, processing subsystem 310 may include processing unit 312 and corresponding local storage 322, and processing unit 314 and corresponding local storage 324.

Local storage 322, 324 may include volatile storage media (e.g., conventional DRAM, SRAM, SDRAM, or the like) and/or non-volatile storage media (e.g., magnetic or optical disk, flash memory, or the like). Storage media incorporated in local storage 322, 324 may be fixed, removable or upgradeable as desired. Local storage 322, 324 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 312, 314 need at runtime. The ROM may store static data and instructions that are needed by processing unit(s) 312, 314. The permanent storage device may be a non-volatile read-and-write memory device that may store instructions and data even when a module including one or more processing units 312, 314 and local storage 322, 324 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 322, 324 may store one or more software programs to be executed by processing unit(s) 312, 314, such as an operating system and/or programs implementing various server functions such as functions of Network analysis system 120, or any other server(s) associated with Network analysis system 120. "Software"

refers generally to sequences of instructions that, when executed by processing unit(s) 312, 314 cause computing system 302 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 312, 314. In some embodiments the instructions may be stored by storage subsystem 368 (e.g., computer readable storage media). In various embodiments, the processing units may execute a variety of programs or code instructions and may maintain multiple concurrently executing programs or processes. At any given time, some or all of the program code to be executed may be resident in local storage 322, 324 and/or in storage subsystem including potentially on one or more storage devices. Software may be implemented as a single program or a collection of separate programs or program modules that interact as desired. From local storage 322, 324 (or non-local storage described below), processing unit(s) 312, 314 may retrieve program instructions to execute and data to process in order to execute various operations described above.

Storage subsystem 368 provides a repository or data store for storing information that is used by computing system 302. Storage subsystem 368 provides a tangible non-transitory computer-readable storage medium for storing the basic programming and data constructs that provide the functionality of some embodiments. Software (programs, code modules, instructions) that when executed by processing subsystem 310 provide the functionality described above may be stored in storage subsystem 368. The software may be executed by one or more processing units of processing subsystem 310. Storage subsystem 368 may also provide a repository for storing data used in accordance with the present disclosure.

Storage subsystem 368 may include one or more non-transitory memory devices, including volatile and non-volatile memory devices. As shown in FIG. 3, storage subsystem 368 includes a system memory 360 and a computer-readable storage media 352. System memory 360 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 302, such as during start-up, may typically be stored in the ROM. The RAM typically contains data and/or program modules that are presently being operated and executed by processing subsystem 310. In some implementations, system memory 360 may include multiple different types of memory, such as static random access memory (SRAM) or dynamic random access memory (DRAM). Storage subsystem 368 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 368.

By way of example, and not limitation, as depicted in FIG. 3, system memory 360 may store application programs 362, which may include client applications, Web browsers, mid-tier applications, relational database management systems (RDBMS), etc., program data 364, and one or more operating systems 366. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 352 may store programming and data constructs that provide the functionality of some embodiments. Software (programs, code modules, instructions) that when executed by processing subsystem 310 a processor provide the functionality described above may be stored in storage subsystem 368. By way of example, computer-readable storage media 352 may include non-volatile memory such as a hard disk drive, a magnetic disk drive, an optical disk drive such as a CD ROM, DVD, a Blu-Ray® disk, or other optical media. Computer-readable storage media 352 may include, but is not limited to, Zip® drives, flash memory cards, universal serial bus (USB) flash drives, secure digital (SD) cards, DVD disks, digital video tape, and the like. Computer-readable storage media 352 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 352 may provide storage of computer-readable instructions, data structures, program modules, and other data for computing system 302.

In certain embodiments, storage subsystem 368 may also include a computer-readable storage media reader 350 that may further be connected to computer-readable storage media 352. Together and, optionally, in combination with system memory 360, computer-readable storage media 352 may comprehensively represent remote, local, fixed, and/or removable storage devices plus storage media for storing computer-readable information.

In certain embodiments, computing system 302 may provide support for executing one or more virtual machines. Computing system 302 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 302. Accordingly, multiple operating systems may potentially be run concurrently by computing system 302. Each virtual machine generally runs independently of the other virtual machines.

Communication subsystem 340 provides an interface to other computer systems and networks. Communication subsystem 340 serves as an interface for receiving data from and transmitting data to other systems from computing system 302. For example, communication subsystem 340 may enable computing system 302 to establish a communication channel to one or more client computing devices via the Internet for receiving and sending information from and to the client computing devices.

Communication subsystem 340 may support both wired and/or wireless communication protocols. For example, in certain embodiments, communication subsystem 340 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 340 may provide wired network connectivity (e.g., Ethernet) in addition to or instead of a wireless interface.

Communication subsystem 340 may receive and transmit data in various forms. For example, in some embodiments, communication subsystem 340 may receive input communication in the form of structured and/or unstructured data feeds, event streams, event updates, and the like. For example, communication subsystem 340 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 340 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 340 may also be configured to output the structured and/or unstructured data feeds, event streams, event updates, and the like to one or more databases that may be in communication with one or more streaming data source computers coupled to computing system 302.

Communication subsystem 340 may provide a communication interface 342, e.g., a WAN interface, which may provide data communication capability between the local area network (bus subsystem 370) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 302 may operate in response to requests received via communication interface 342. Further, in some embodiments, communication interface 342 may connect computing systems 302 to each other, providing scalable systems capable of managing high volumes of activity. Conventional or other techniques for managing server systems and server farms (collections of server systems that cooperate) may be used, including dynamic resource allocation and reallocation.

Computing system 302 may interact with various user-owned or user-operated devices via a wide-area network such as the Internet. An example of a user-operated device is shown in FIG. 3 as client computing system 302. Client computing system 304 may be implemented, for example, as a consumer device such as a smart phone, other mobile phone, tablet computer, wearable computing device (e.g., smart watch, eyeglasses), desktop computer, laptop computer, and so on.

For example, client computing system 304 may communicate with computing system 302 via communication interface 342. Client computing system 304 may include conventional computer components such as processing unit(s) 382, storage device 384, network interface 380, user input device 386, and user output device 388. Client computing system 304 may be a computing device implemented in a variety of form factors, such as a desktop computer, laptop computer, tablet computer, smart phone, other mobile computing device, wearable computing device, or the like.

Processing unit(s) 382 and storage device 384 may be similar to processing unit(s) 312, 314 and local storage 322, 324 described above. Suitable devices may be selected based on the demands to be placed on client computing system 304; for example, client computing system 304 may be implemented as a "thin" client with limited processing capability or as a high-powered computing device. Client computing system 304 may be provisioned with program code executable by processing unit(s) 382 to enable various interactions with computing system 302 of a message management service such as accessing messages, performing actions on messages, and other interactions described above. Some client computing systems 304 may also interact with a messaging service independently of the message management service.

Network interface 380 may provide a connection to a wide area network (e.g., the Internet) to which communication interface 340 of computing system 302 is also connected. In various embodiments, network interface 380 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 386 may include any device (or devices) via which a user may provide signals to client computing system 304; client computing system 304 may interpret the signals as indicative of particular user requests or information. In various embodiments, user input device 386 may include any or all of a keyboard, touch pad, touch screen, mouse or other pointing device, scroll wheel, click wheel, dial, button, switch, keypad, microphone, and so on.

User output device 388 may include any device via which client computing system 304 may provide information to a user. For example, user output device 388 may include a display to display images generated by or delivered to client computing system 304. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 388 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 312, 314 and 382 may provide various functionality for computing system 302 and client computing system 304, including any of the functionality described herein as being performed by a server or client, or other functionality associated with message management services.

It will be appreciated that computing system 302 and client computing system 304 are illustrative and that variations and modifications are possible. Computer systems used in connection with embodiments of the present disclosure may have other capabilities not specifically described here. Further, while computing system 302 and client computing system 304 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While the present disclosure has been described with respect to specific embodiments, one skilled in the art will recognize that numerous modifications are possible. For instance, although specific processes are described with reference to FIGS. 2 and 3, other processes may be implemented. Embodiments of the present disclosure may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. Thus, although the present disclosure has been described with respect to specific embodiments, it will be appreciated that the present disclosure is intended to cover all modifications and equivalents within the scope of the following claims.

What is claimed is:

1. A method comprising, at a computer system:
monitoring network data from one or more data sources;
based on detecting, in the network data, a network event related to a username within a social media site:
identifying, in the network data, an identifier associated with the network event to assess a network threat to an identity of an entity;
generating, by converting from a first format of the identifier, a converted identifier having a second format;
determining one or more words associated with the identity of the entity;
determining a measure of similarity of the converted identifier to each of the one or more words associated with the identity of the entity;
determining the measure of similarity satisfies a threshold for assessing the network threat to the identity of the entity;
generating a set of terms by parsing the converted identifier using a plurality of terms obtained from a data source; and computing, using a classification model, a measure of the network threat to the identity of the entity based on a relationship of the set of terms, wherein the relationship of the set of terms is determined as a value based on each uniquely weighted term of the set of terms, and wherein the measure of the network threat is based in part on the value of the relationship of the set of terms.

2. The method of claim 1, further comprising:
detecting, in the network data, a first occurrence of the network event; and
determining that the identifier is one of: a corporate functional term appended to the identity of the entity, or a keyword associated with one or more trademark identifiers associated with a brand of the entity appended to the identity of the entity.

3. The method of claim 1, wherein generating the converted identifier includes decoding the identifier from the first format that is encoded by Punycode, wherein the converted identifier is generated based on mapping the decoded identifier to the converted identifier, wherein the decoded identifier is mapped to the converted identifier based on one or more mappings, wherein each of the one or more mappings is for one or more homoglyphs in the decoded identifier to one or more ASCII equivalents, and wherein the converted identifier is based at least in part on the one or more ASCII equivalents for the one or more mappings.

4. The method of claim 1, wherein the measure of similarity is determined based on computing a similarity distance for each of the one or more words compared to the converted identifier.

5. The method of claim 1, wherein the data source includes a repository of known words.

6. The method of claim 1, wherein the one or more words associated with the identity of the entity includes one or more trademark identifiers associated with a brand of the entity.

7. The method of claim 6, wherein the data source is a first data source, and wherein determining the one or more words associated with the identity of the entity includes accessing the one or more words from a second data source.

8. The method of claim 1, wherein the data source is a first data source, wherein the measure is a first measure, and wherein the method further comprises:
computing a second measure of the network threat to the identity of the entity based on assessing the plurality of terms using a second data source; and
determining, based on the first measure and the second measure, a third measure of the network threat to the identity of the entity.

9. The method of claim 8, wherein the second data source includes one of: a repository of malicious names, a repository of classifications for a brand, or a repository of corporate functional words for the brand.

10. The method of claim 1, wherein the data source is a first data source, and wherein the measure of the network threat may be computed using a second data source.

11. One or more non-transitory computer-readable storage media, storing one or more sequences of instructions, which when executed by one or more processors cause performance of:
monitoring network data from one or more data sources;
based on detecting, in the network data, a network event related to a username within a social media site:
identifying, in the network data, an identifier associated with the network event to assess a network threat to an identity of an entity;
generating, by converting from a first format of the identifier, a converted identifier having a second format;
determining one or more words associated with the identity of the entity;
determining a measure of similarity of the converted identifier to each of the one or more words associated with the identity of the entity;
determining the measure of similarity satisfies a threshold for assessing the network threat to the identity of the entity;
generating a set of terms by parsing the converted identifier using a plurality of terms obtained from a data source; and computing, using a classification model, a measure of the network threat to the identity of the entity based on a relationship of the set of terms, wherein the relationship of the set of terms is determined as a value based on each uniquely weighted term of the set of terms, and wherein the measure of the network threat is based in part on the value of the relationship of the set of terms.

12. The one or more non-transitory computer-readable storage media of claim 11, which when executed by the one or more processors cause further performance of:
detecting, in the network data, a first occurrence of the network event; and
determining that the identifier is one of: a corporate functional term appended to the identity of the entity, or a keyword associated with one or more trademark identifiers associated with a brand of the entity appended to the identity of the entity.

13. The one or more non-transitory computer-readable storage media of claim 11, wherein generating the converted identifier includes decoding the identifier from the first format that is encoded by Punycode, wherein the converted identifier is generated based on mapping the decoded identifier to the converted identifier, wherein the decoded identifier is mapped to the converted identifier based on one or more mappings, wherein each of the one or more mappings is for one or more homoglyphs in the decoded identifier to one or more ASCII equivalents, and wherein the converted identifier is based at least in part on the one or more ASCII equivalents for the one or more mappings.

14. The one or more non-transitory computer-readable storage media of claim 11, wherein the measure of similarity is determined based on computing a similarity distance for each of the one or more words compared to the converted identifier.

15. The one or more non-transitory computer-readable storage media of claim 11, wherein the data source is a first data source, wherein the measure is a first measure, and which when executed by the one or more processors cause further performance of:
   computing a second measure of the network threat to the identity of the entity based on assessing the plurality of terms using a second data source; and
   determining, based on the first measure and the second measure, a third measure of the network threat to the identity of the entity.

16. A system, comprising:
   one or more computing processors;
   one or more non-transitory computer readable media storing a program of instructions that is executable by the one or more computing processors to perform:
      monitoring network data from one or more data sources;
      based on detecting, in the network data, a network event related to a username within a social media site:
         identifying, in the network data, an identifier associated with the network event to assess a network threat to an identity of an entity;
         generating, by converting from a first format of the identifier, a converted identifier having a second format;
         determining one or more words associated with the identity of the entity;
         determining a measure of similarity of the converted identifier to each of the one or more words associated with the identity of the entity;
         determining the measure of similarity satisfies a threshold for assessing the network threat to the identity of the entity; generating a set of terms by parsing the converted identifier using a plurality of terms obtained from a data source; and computing, using a classification model, a measure of the network threat to the identity of the entity based on a relationship of the set of terms, wherein the relationship of the set of terms is determined as a value based on each uniquely weighted term of the set of terms, and wherein the measure of the network threat is based in part on the value of the relationship of the set of terms.

17. The system of claim 16, which when executed by the one or more processors cause further performance of:
   detecting, in the network data, a first occurrence of the network event; and
   determining that the identifier is one of: a corporate functional term appended to the identity of the entity, or a keyword associated with one or more trademark identifiers associated with a brand of the entity appended to the identity of the entity.

18. The system of claim 16, wherein generating the converted identifier includes decoding the identifier from the first format that is encoded by Punycode, wherein the converted identifier is generated based on mapping the decoded identifier to the converted identifier, wherein the decoded identifier is mapped to the converted identifier based on one or more mappings, wherein each of the one or more mappings is for one or more homoglyphs in the decoded identifier to one or more ASCII equivalents, and wherein the converted identifier is based at least in part on the one or more ASCII equivalents for the one or more mappings.

19. The system of claim 16, wherein the measure of similarity is determined based on computing a similarity distance for each of the one or more words compared to the converted identifier.

20. The system of claim 16, wherein the data source is a first data source, wherein the measure is a first measure, and which when executed by the one or more processors cause further performance of:
   computing a second measure of the network threat to the identity of the entity based on assessing the plurality of terms using a second data source; and
   determining, based on the first measure and the second measure, a third measure of the network threat to the identity of the entity.

* * * * *